US006639977B1

(12) United States Patent
Swope et al.

(10) Patent No.: US 6,639,977 B1
(45) Date of Patent: Oct. 28, 2003

(54) SYSTEM AND METHOD FOR REVERSE BILLING OF A TELEPHONE CALL

(75) Inventors: Bobb Swope, Coppell, TX (US); Donald B. Vaello, San Antonio, TX (US)

(73) Assignee: Evercom Systems, Inc., Irving, TX (US)

(*) Notice: Subject to any disclaimer, the term of this patent is extended or adjusted under 35 U.S.C. 154(b) by 85 days.

(21) Appl. No.: 09/640,831

(22) Filed: Aug. 17, 2000

(51) Int. Cl.[7] .............................................. H04M 15/00
(52) U.S. Cl. .......................... 379/114.21; 379/114.01; 379/114.14; 379/114.23; 379/114.26
(58) Field of Search ........................... 379/111, 112.01, 379/114.01, 114.15–114.2, 114.21–114.26, 127.01–127.04, 133–134, 144.01

(56) References Cited

U.S. PATENT DOCUMENTS

| 4,791,640 A | | 12/1988 | Sand |
| 5,210,789 A | * | 5/1993 | Jeffus et al. |
| 5,359,642 A | | 10/1994 | Castro |
| 5,359,643 A | | 10/1994 | Gammino |
| 5,483,581 A | | 1/1996 | Hird et al. |
| 5,592,537 A | | 1/1997 | Moen |
| 5,715,298 A | | 2/1998 | Rogers |
| 5,742,667 A | | 4/1998 | Smith |
| 5,748,711 A | | 5/1998 | Scherer |
| 5,825,857 A | | 10/1998 | Reto et al. |
| 5,835,580 A | | 11/1998 | Fraser |
| 5,854,833 A | | 12/1998 | Hogan et al. |
| 5,859,900 A | * | 1/1999 | Bauer et al. |
| 5,867,566 A | | 2/1999 | Hogan et al. |
| 5,870,723 A | * | 2/1999 | Pare, Jr. et al. |
| 5,875,236 A | | 2/1999 | Jankowitz et al. |
| 5,894,511 A | | 4/1999 | Jordan |
| 5,960,416 A | | 9/1999 | Block |
| 6,031,898 A | | 2/2000 | Jordan |
| 6,035,025 A | * | 3/2000 | Hanson |
| 6,044,247 A | * | 3/2000 | Taskett et al. |
| 6,222,912 B1 | | 4/2001 | Breuer |
| 6,226,366 B1 | | 5/2001 | Bala et al. |

FOREIGN PATENT DOCUMENTS

| EP | 0 380 189 A | 8/1990 |
| WO | WO 98/32275 A | 7/1998 |

OTHER PUBLICATIONS

International Search Report issued Sep. 10, 2002 PCT/US 01/41744.

* cited by examiner

*Primary Examiner*—Duc Nguyen
(74) *Attorney, Agent, or Firm*—Fulbright & Jaworski, L.L.P.

(57) ABSTRACT

The present invention is a system and method that allows a calling party to call a destination number and, upon approval of the called party, reverse the billing of the telephone call so that it is deducted from an account owned and maintained by the called party other than the account associated with the destination number. The method of the present invention includes the steps of receiving a predetermined access number from a calling party; prompting for a destination number; notifying a called party of the call they are receiving; allowing the called party to accept the call and enter a number associated with an account other than the telephone service account of the destination telephone number; verifying the account number and whether the account has sufficient value available; completing the telephone call to the destination number; and processing the charges associated with the call to be charged against the account.

20 Claims, 4 Drawing Sheets

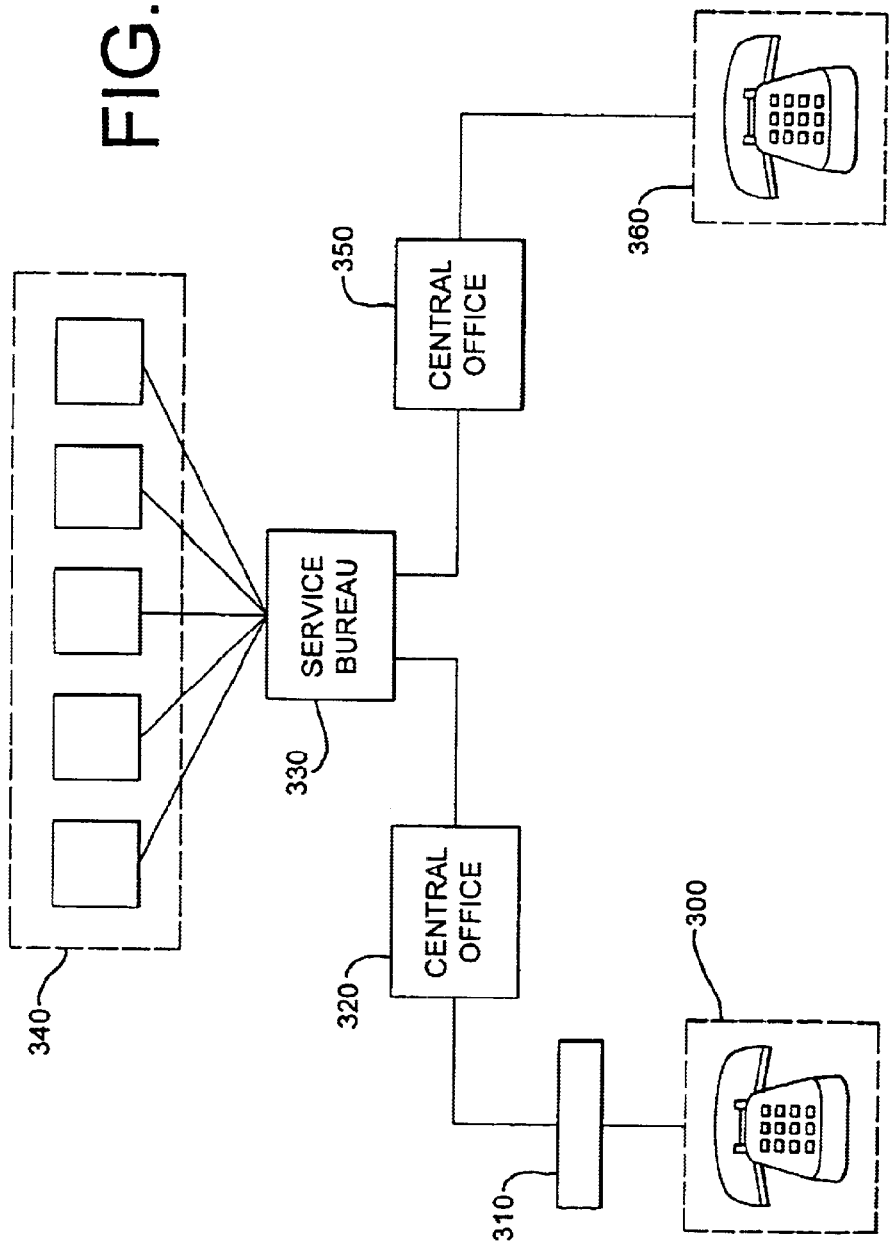

SYSTEM AND METHOD FOR REVERSE BILLING OF A TELEPHONE CALL

TECHNICAL FIELD present invention generally relates to a method of providing telephone communications between a calling party and a called party wherein the called party assumes the responsibility for the costs associated with the telephone call, and more specifically to a telephone billing system and method that allows the called party an option to designate an account to be charged for the call other than the account associated with telephone service at the call destination or any other call destination.

BACKGROUND OF THE INVENTION

Conventional methods of placing telephone calls utilizing so called "reverse billing", wherein a called party assumes the cost of the call, involve the placing of collect telephone calls. A collect telephone call can be placed by a calling party and the called party may then accept or deny the call and the associated charges. The cost of the collect call is billed to the called number and appears on the telephone billing statement of the called number. Thus, the collect call billing method is restricted to the telephone service account of the called number, i.e., the specific destination number.

On the other hand, a calling party has the option of placing a telephone call from any telephone and paying for the call by alternate means, such as with a credit card or a prepaid calling card. In these situations, the calling party is usually the owner of the card or account. Thus, they are in control of the account and any associated Customer Identification and Verification (CIV), such as a Personal Identification Number (PIN).

However, no current methods are known that allow the called party the same flexibility, that is to direct charges of a telephone call to a credit card, debit card, or prepaid calling card, account.

In many situations, a called party, such as a relative, friend, or business associate of a calling party, may have an important need for establishing telephone communications with the calling party that allows the called party to accept the cost of the call while maintaining ownership and control of the charged account. For example, a parent may have an important need to allow a child to call home from a public telephone without using a calling card, credit card, collect charging, or coins. Another example exists in connection with correctional facilities, where family members may wish to receive calls from an inmate and accept the charges of the call without incurring higher costs associated with normal collect calling. Yet another example exist where the called party may be at a destination number where accepting charges to that account would be inappropriate, such as a parent or husband at their place of employment.

A need also exists for reverse billing, or called-party billing, at rates lower than those associated with normal collect calls and that allows the called party to charge the call to an account other than the telephone service account of the called number, such as a credit card account or a prepaid calling card account.

SUMMARY OF THE INVENTION

The present invention is a telephone billing system and method that allows for reverse billing of a telephone call, i.e., wherein the calling party relies on the called party to assume the cost of the telephone call. The method allows a called party at a destination telephone number to accept or deny the call, and, if the call is accepted, to bill the call to a credit card account, debit card account, a prepaid calling card account, or any other type of account not necessarily associated with the telephone service account of the destination telephone number. This allows the called party to receive calls anywhere where billing the service account is not desired or appropriate. The present method also allows the called party to maintain ownership and control of the charged account. The present method further allows the called party to avoid collect call services.

The method of the present invention includes the steps of receiving a predetermined access number from a calling party; prompting for a destination number; notifying a called party of the call they are receiving; allowing the called party to accept the call and enter a number associated with an account other than the telephone service account of the destination telephone number; verifying the account number and whether the account has sufficient value available; completing the telephone call to the destination number; and processing the charges associated with the call to be charged against the account.

The method of the present invention may also include other steps requiring Customer Identification and Verification (CIV) and other database inquiries for controlling and regulating the system.

The present invention allows: an account holder to fix an amount of monetary value within the account to avoid excessive monthly phone bills that are typically associated with collect calls; allows an account holder to accept calls at locations away from home since the account is not associated with the destination number as with collect calling methods; and allows the account holder to be charged lower rates than the typical rates associated with standard collect calling methods.

In a particular application, the method is implemented in correctional facilities, wherein friends and family members can purchase an account having a prepaid amount of calling value from a provider such as the correctional facility. Thus, the prepaid account allows the friends and family members to maintain ownership and control of the charged account as opposed to the inmate maintaining ownership.

BRIEF DESCRIPTION OF THE DRAWINGS

FIG. 4 is a block diagram of a specific embodiment of the system of the present invention implemented on a telecommunications network and in connection with a premises-based telecommunications system, such as at a correctional facility.

DETAILED DESCRIPTION OF THE PREFERRED EMBODIMENTS

While the present invention will be described fully hereinafter with reference to the accompanying drawings, in which particular embodiments are shown, it is to be understood at the outset that persons skilled in the art may modify the embodiments herein described while still achieving the desired result of this invention. Accordingly, the description which follows is to be understood as a broad informative disclosure directed to persons skilled in the appropriate arts and not as limitations of the present invention.

The present invention allows a calling party to call a destination number and, upon approval of the called party, reverse the billing of the telephone call so that it is deducted from an account owned and maintained by the called party other than the account associated with the destination number. Thus, the present invention provides an alternative reverse billing method to a conventional collect call. The account can be a credit card account, a checking or savings account having an associated debit or checking card, a conventional pre-paid calling card, or a special prepaid account as described herein.

Figure 1:
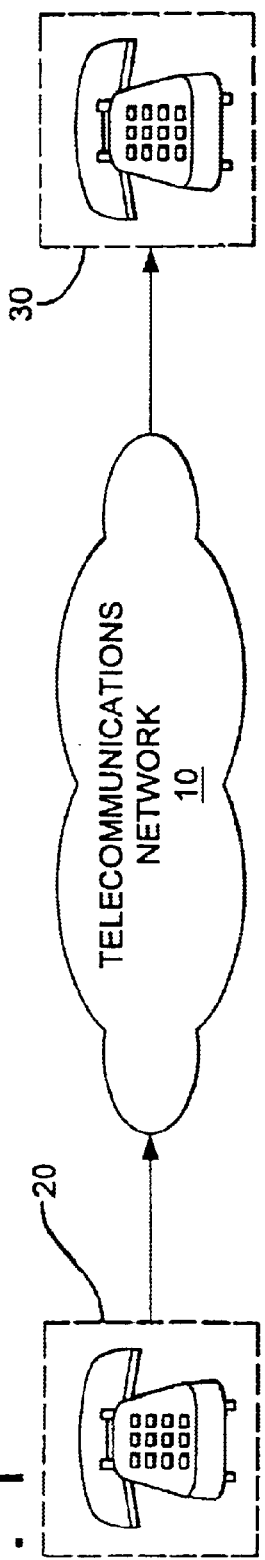
FIG. 1 is a block diagram generically depicting a system according to the present invention.

The present invention can be implemented on any type of telecommunications network system. In a basic form, the present invention can be implemented utilizing a modified collect call system and method. FIG. 1 generically depicts a telecommunications network 10 in communication with an originating device 20 and a terminating device 30. The network 10 is a Public Switched Telephone Network (PSTN) in the United States or a similar network in another country or other private or public network. The network 10 includes telecommunications infrastructure that is well known in the telecommunications industry.

An originating party, or calling party, uses the device 20 to initiate a telephone call as a typical collect call to a called party, wherein the calling party enters a "0" (or a "1"and an "800" number), and then a 10-digit destination number. The device 20 may be a telephone set, computer, facsimile machine, or any other device that is capable of placing a telephone call or using a telephone line. The network 10 facilitates connection of the call and notification of the called party that it is in receipt of a collect call from the calling party. The method of the present invention now provides alternate payment methods for the call in addition to the present standard collect call payment method of billing the call to the telephone service account associated with the destination number. The called party is now given the option to bill the call to a credit card account, debit card account, a prepaid calling card account, or any other type of account not associated with the telephone service account of the destination telephone number, or, accept the call utilizing standard collect calling methods wherein the call is billed to the destination number. In contrast to the standard collect calling method, which is limited to only billing the call to the destination number through normal network conventions, the method of the present invention allows the called party to accept a reverse-billed telephone call from any location, i.e., separate from the location associated with the destination telephone line. The implementation of the method of the present invention is well within the ordinary skill of a person in the telecommunications industry.

Figure 2:
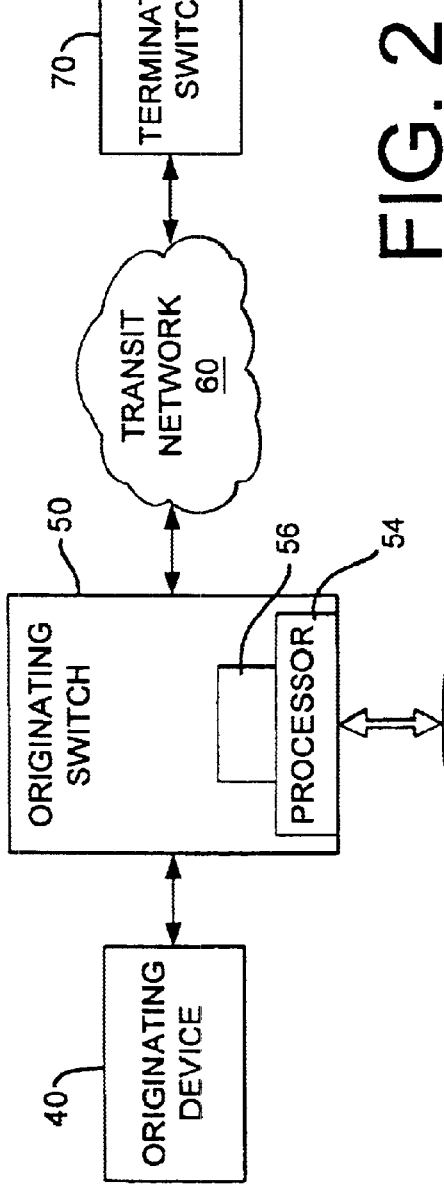
FIG. 2 is a block diagram of a specific embodiment of the system of the present invention implemented on a telecommunications network.
Figure 2:
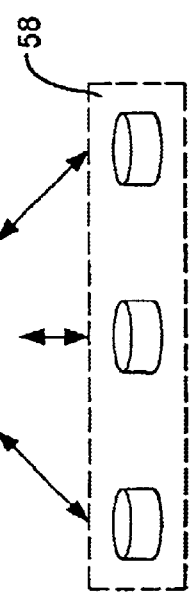

FIG. 2 depicts a telephony network that is used to implement a particular embodiment of the present invention. An originating party, or calling party, uses a device 40 to initiate a telephone call. The device 40 may be a telephone set, computer, facsimile machine, or any other device that is capable of placing a telephone call or using a telephone line. In this particular embodiment, an originating switch 50 communicates with a database 52. The originating switch 50 may be a 5ESS.RTM. switch, a 4ESS.RTM. switch (available from Lucent Technologies, Inc., for example), a private branch exchange (PBX), or other local switching device. It is important to note that the originating switch 50 may be part of a private premises-based telephone system, part of a Local Exchange Company (LEC) network system, or may be part of an Interexchange Carrier (IXC) system that is co-located at a switching office of the LEC. The originating switch 50 utilizes a processor 54 to prompt a calling party for a destination number. The processor 54 utilizes a collection and detection device 56 to collect the entry of the destination number from the calling party. The device 56 may be a DTMF collection and detection device, a voice recognition collection and detection device, or other form of device that can collect and detect data from the calling party at the originating device 40. The device 56 can also be a dial pulse collector where dial pulse is utilized. The database 52 may be an Advanced Intelligent Network (AIN) Service Control Point (SCP), a Network Control Point (NCP), a Line Information Data Base (LIDB), or other similar database device. It is to be understood that the database 52 is capable of accessing other databases through a network of multiple databases 58.

When a telephone call is placed by the calling party at the device 40, it is eventually connected through a transit network 60 and a terminating switch 70 to a terminating device 80. The transit network 60 is a Public Switched Telephone Network (PSTN) in the United States or a similar network in another country or other private or public network. The device 80 may be a telephone set, computer, facsimile machine, or any other device that is capable of placing a telephone call or using a telephone line.

Figure 3A:
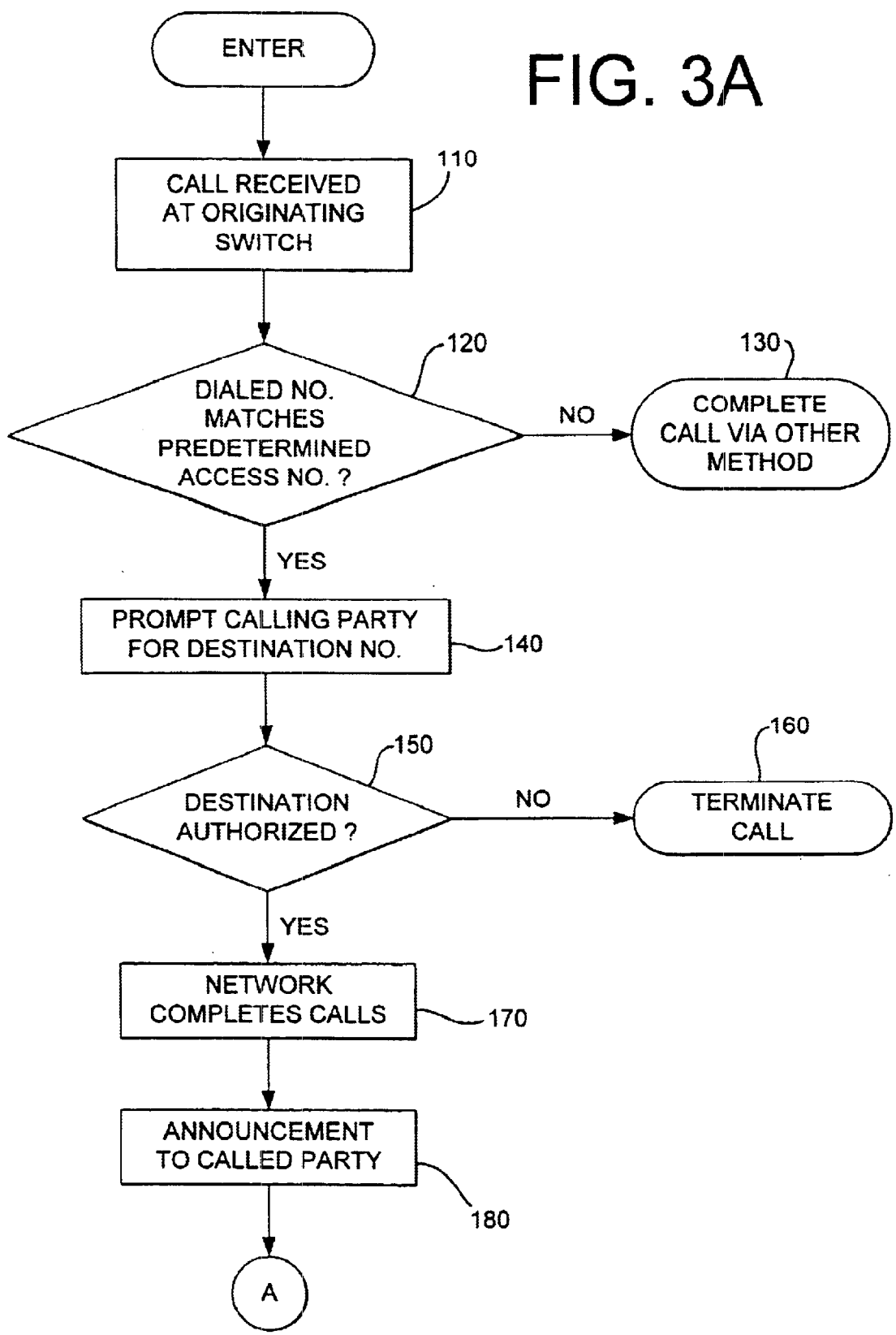
FIG. 3A and FIG. 3B show a flow chart of a method of the embodiment of the system depicted in FIG. 2.
Figure 3B:
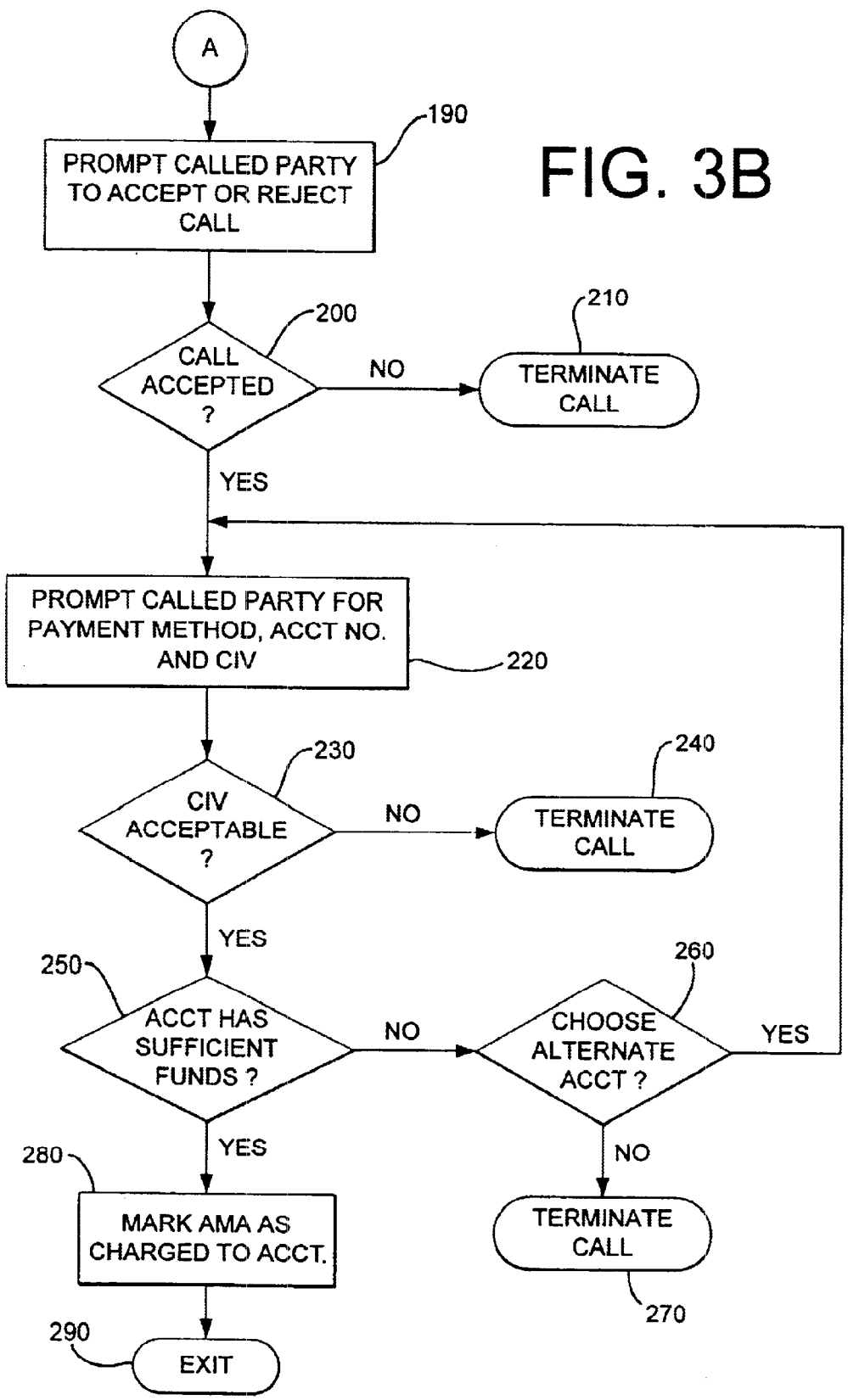

FIG. 3 is a flow chart depicting the sequence of events of the present invention as implemented in the particular embodiment depicted in FIG. 1. It is to be understood at the outset that some of the steps depicted in FIG. 3 are optional and are not to be interpreted as narrowing the scope of the present invention. These optional steps can be excluded without departing from the spirit of the present invention.

Referring to FIG. 3, a telephone call placed by a calling party at the originating device 40 marks an entry point 100. At step 110, the call is received at the originating switch 50. At step 120, the originating switch 50 looks at the dialed number (dialed by the calling party) and compares it to an access number of the present invention. The access number is preferably a toll-free access number, but may be any type of number. If the dialed number does not match the access number, the call is completed using an alternate method at step 130, such as direct billing, calling card, credit card, collect charging, an operator, or coins. If the dialed number matches the access number, the method proceeds to step 140.

At step 140, the originating switch 50 utilizes processor 54 to prompt the calling party for the destination number. The destination number is a 10-digit number of the destination that the calling party wishes to reach. The processor 54 utilizes the collection and detection device 56 to collect the entry of the destination number from the calling party. The processor 54 may optionally contact the database 52 and pass a protocol data message to the database 52. This data may include the Automatic Number Identification (ANI), the type and location of the device 40, and the destination number.

Alternately, step 140 can be eliminated by requiring the calling party to enter the destination number at the same time he or she dials the predetermined access number. In this case, the method would proceed directly to step 150 or 170 after the call is dialed by the calling party.

At step 150, the database 52 uses the data to determine if the call should be completed. Specifically, the database 52 looks up the destination number in its tables to see if calls are permitted to the destination number, given the destination number, the ANI (which is used to determine where the call is originating from by use of the NPA-NXX digits), and type of device 40 (which is used to determine the type of device or line, for example, if the calling party is using a pay phone, facsimile machine, etc.). At this point, the database 52 may optionally contact one or more databases 58, such as the Line Information Database (LIDB), to determine other information related to the destination number, such as collect denied. This authorization step 150 is an optional step.

If the call to the destination number is declared to be invalid (for reasons such as originating area (for example, prisons, international, etc.), calling party type of device, line type, etc., step 160 will terminate the call with an error message to the calling party or ask the calling party to enter another number at step 140.

At step 170, the originating switch 50 routes the call through the transit network 60 to the terminating switch 70. When the called party answers the terminating device 80, step 180 plays a brief announcement to the called party. This announcement is played by processor 54. The announcement might say "You are receiving a reverse-billing telephone call."

At step 190, the called party is prompted to accept or reject the call. If the call is not accepted at step 200, then the call is terminated at step 210. If the call is accepted, then the called party is prompted at step 220 for a method of payment, an account number and an optional Customer Identification and Verification (CIV), such as a Personal Identification Number (PfN).

The processor 54 uses collection device 56 to collect the entry of the account information and the CIV number from the calling party. The account information and the CIV number is preferably collected by a DTMF collection device. However, speech verification or other forms of digit entry could also be used for this prompting and collecting. Account information may also be entered with a magnetic swipe card and telephone swiper (reader) combination, a bar code scanner connected to the telephone, or an automated biometric reading device, such as "Iris Scanning," finger or palm imaging, or the like. Alternatively, the information may also be collected by a live operator. At step 230, the processor 54 compares the CIV entered by the calling party with a CIV returned from the database 52 in connection with the account selected. If the two CIVs match, then the CIV entered by the calling party is determined valid and control proceeds to step 250. If the two CIVs do not match, then the CIV entered by the calling party is determined invalid and step 240 terminates the call or requests the calling party to enter another CIV number. Similarly, voice messages such as keywords or names and addresses may also be compared in determining the validity of the calling party.

At step 240, a security feature can be included that limits the number of failed attempts of CIV entry before the call is terminated. With this option, the system keeps track of the number of CIV failures associated with the destination number. For example, if a called party enters an incorrect CIV, the system utilizes the ANI and attributes a failed CIV attempt with the destination number. The number of failed CIV attempts is counted by the system and if the count reaches a predetermined maximum number, the system assumes that the party entering the CIV is a "hacker" and terminates the call. Optionally, the system can maintain a record of failed CIV attempts associated with a particular destination number within a database of the system, such as database 52 or one or more of the databases 58.

At step 250, the processor 54 determines whether the account selected has sufficient funds or credit to cover the cost of the call. The processor 54 may compare the value of the account that is returned by the database 52 with a predetermined minimum value needed to complete a call. Alternatively, any type of criteria may be used to determine whether the account has sufficient funds. For example, an estimated cost may be calculated by the processor 54 based on the originating number, the destination number, time of day, an estimate of call duration, or any combination of factors. If the account does not have sufficient funds available, then step 260 allows the called party to choose an alternate account or otherwise terminate the call at step 270.

If the account has sufficient funds, the automatic message accounting (AMA) record, or some other form of record is marked as charged to the account number given by the called party at step 280. The method may be terminated at step 290 or alternatively may continue with an automatic billing of the account before termination.

The present invention allows an account holder to accept calls at locations away from home since the account is not associated with the destination number as with collect calling methods. The present invention also allows the account holder to be charged lower rates than the typical rates associated with standard collect calling methods.

In accordance with the present invention, a prepaid reverse-billing account card may be issued to anyone that desires to receive calls and have the option of reverse billing the cost of the call. In this type of application, a person may purchase value for the account and have the cost of the call received from the calling party deducted from the account in accordance with the method of the present invention.

The prepaid reverse-billing account card and the method of the present invention can be applied to any consuming group. However, this particular application is particularly useful to the corrections industry for use with inmates and their friends, family, loved ones, etc. In such an application, a correctional facility having a premises based telecommunications system or a telecommunications provider may provide a prepaid reverse-billing account that can be purchased by anyone wishing to receive calls in accordance with the present invention. The prepaid account can be offered in addition to the other methods of payment, such as credit card, debit card, etc. The prepaid account allows an account holder to fix an amount of monetary value within the account to avoid excessive monthly phone bills that are typically associated with collect calls. The prepaid account can include security features such as the CIV features described herein. Thus, the prepaid account allows the called party to maintain ownership and control of the charged account as opposed to the inmate maintaining ownership. In a correctional facility application, the destination numbers can also be screened for authorization as an additional security feature.

FIG. 4 depicts an embodiment of the present invention as implemented in connection with a correctional facility or other institution having at least one originating telephone 300 connected to a premises-based telecommunications system 310. However, it is to be understood that this embodiment could be utilized in connection with any location having a premises-based telecommunications system. A prisoner initiates a telephone call to a called party by dialing a predetermined access number. The call is received at a central office 320 of a typical telecommunications system network, such as the PSTN, and routed to a service bureau 330, which is the location associated with the access number. The service bureau includes the necessary equipment to facilitate the method of the present invention, including a processor (not shown) that can link to one or more databases 340 and a collection and detection device (not shown), such as a DTMF collection and detection device, for receiving data entered by the called party.

The processor can prompt the prisoner for a destination number, or, alternatively, the system can be designed so that the destination number is entered when the access number is dialed. The processor utilizes the collection and detection device to collect the entry of the destination number from the calling party. The processor may optionally contact one or more databases and pass a protocol data message to the databases. This data may include the Automatic Number Identification (ANI), the type and location of the device 300, and the destination number. The databases may be used for determining authorization of the destination number.

The processor routes the call to a central office 350 associated with the geographic location associated with the destination number. The central office routes the call to the destination number. When the called party answers a telephone 360 they are notified of the call and given the option to accept or reject the call. If accepted, the processor at the service bureau prompts the called party to select a method of payment, which can be from any type of account, including the prepaid account issued in connection with the correctional facility. The account information is entered by the called party. The called party may optionally be prompted for a CIV. If a CIV is required, the system may also optionally include a "hacker" security feature as previously described, wherein the number of failed CIV attempts is limited to a predetermined number before the call is terminated.

The processor at the service bureau connects to one or more of the databases to validate the account and determine whether sufficient funds are present to complete the call. If the account has sufficient funds, the processor completes the call by establishing a connection between the originating telephone 300 and a destination telephone 360. A record, such as an AMA, is established by the processor indicating that the call was reverse-billed, the account number, the duration of the call, the cost of the call, etc.

While the specific embodiments have been illustrated and described, numerous modifications come to mind without significantly departing from the spirit of the invention and the scope of protection is only limited by the scope of the accompanying claims.

What is claimed is:

1. A method for connecting and billing a telephone call, comprising the steps of:
   receiving a predetermined access telephone number from a calling party;
   prompting the calling party for a destination number;
   identifying an account of a called party;
   determining if the account has sufficient funds to complete the call:
   notifying the called party of the call they are receiving;
   prompting the called party for acceptance of the call;
   prompting the called party for a CIV, wherein the CIV is utilized with an ANI of the destination number to identify a number of failed CIV attempts in a predetermined database;
   completing the telephone call to the destination number; and
   deducting the cost of the telephone call form the account.

2. The method of claim 1, wherein the account of the called party is identified by an identification number provided by the calling party.

3. The method of claim 1, wherein the CIV includes a Personal Identification Number (PIN).

4. The method of claim 1, wherein the CIV includes voice recognition of the called party.

5. A method for connecting and billing a telephone calls from a correctional facility, said method comprising:
   providing telecommunication system in communication with said correctional facility;
   establishing prepaid reverse-billing accounts with respect to a plurality of persons wishing to receive telephone calls from said correctional facility, said prepaid reverse-billing accounts being provided by said correctional facility;
   receiving a destination number from a calling party incarcerated within said correctional facility desirous of establishing communication with a called party of said plurality of persons;
   allowing the called party to accept the telephone call and provide information associated with an account of said prepaid reverse-billing accounts to which the accepted telephone call is to be charged; and
   completing the telephone call to the destination number.

6. The method of claim 5, wherein said telecommunication system comprises a correctional facility premises-based telecommunication system provided at said correctional facility.

7. The method of claim 5, further comprising:
   determining if a call to the destination number should be completed; and
   if it is determined that the call to the destination number should not be completed, preventing completion of the call to the destination number.

8. The method of claim 7, wherein said determining if the call to the destination number should be completed utilizes information with respect to the destination number itself.

9. The method of claim 8, wherein said determining if the call to the destination number should be completed further utilizes information with respect to where the call is originating from.

10. The method of claim 9, wherein said determining if the call to the destination number should be completed further utilizes information with respect to the type of device the calling party is using to place the call.

11. The method of claim 5, further comprising:
    validating the account information provided by the called party.

12. The method of claim 11, further comprising:
    obtaining a CIV from the called party for validating the account.

13. The method of claim 12, further comprising:
    tracking a number of CIV failures associated with the destination number; and
    terminating call attempts if the number of CIV failures reaches a predetermined maximum number.

14. The method of claim 5, further comprising:
    determining whether the account has sufficient value available for charges associated with the telephone call as completed.

15. A system for connecting and billing a telephone calls from a correctional facility, said system comprising:
    a correctional facility premises-based telecommunication system provided at said correctional facility;

a plurality of prepaid reverse-billing accounts associated with a plurality of persons wishing to receive telephone calls from said correctional facility, said prepaid reverse-billing accounts being in communication with said telecommunication system;

a calling party terminal coupled to said telecommunication system providing a destination number from a calling party incarcerated within said correctional facility desirous of establishing communication with a called party of said plurality of persons; and a called party terminal coupled to said telecommunication system providing information regarding the called party accepting the telephone call and providing information associated with an account of said prepaid reverse-billing accounts to which the accepted telephone call is to be charged to said telecommunication system.

16. The system of claim 15, wherein said prepaid reverse-billing accounts are provided by said-correctional facility.

17. The system of claim 15, further comprising:

a database storing information with respect to particular destination numbers for which calls should be completed or should not be completed.

18. The system of claim 15, further comprising:

a database storing a number of CIV failures associated with the destination number and a predetermined maximum number of allowable CIV failures.

19. The system of claim 15, further comprising:

logic operable to determine whether the account has sufficient value available for charges associated with the telephone call as completed.

20. The system of claim 15, wherein said information associated with said account is provided by a technique from the group consisting of DTMF tones, swiping a card with a magnetic strip through a swiper, said called party speaking into said called party terminal, scanning a bar code with a scanner that is electrically connected to said called party terminal, and use of an automated biometric reading device.

* * * * *